Aug. 18, 1931.  C. C. FARMER  1,819,642

FLUID PRESSURE BRAKE

Filed March 9, 1929

INVENTOR
CLYDE C. FARMER
BY *Wm. M. Cady*
ATTORNEY

Patented Aug. 18, 1931

1,819,642

UNITED STATES PATENT OFFICE

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA

FLUID PRESSURE BRAKE

Application filed March 9, 1929. Serial No. 345,659.

This invention relates to fluid pressure brake equipments and has for its principal object to provide an improved equipment for controlling the application and release of the brakes.

Other objects and advantages will appear in the following more detailed description of the invention.

Figure 1:
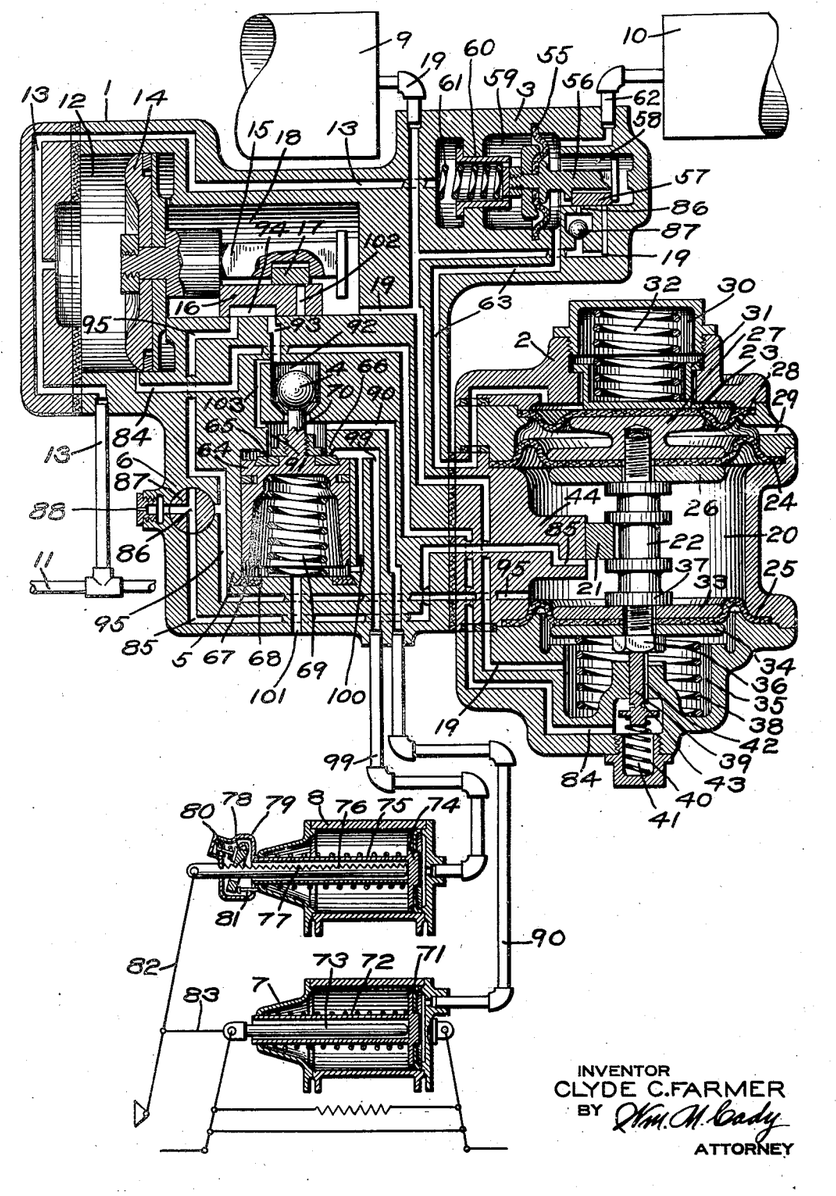
The single figure is a diagrammatic view, mainly in section, of a fluid pressure brake equipment embodying my invention.

According to my invention, the brake equipment may comprise a triple valve device 1, a control valve device 2, a combined charging and discharging valve device 3, a quick inshot valve 4, a load cylinder cut-in valve device 5, a release change-over valve device 6, an empty brake cylinder 7, a load brake cylinder 8, an auxiliary reservoir 9, a control reservoir 10 and a brake pipe 11.

The triple valve device 1 may comprise a casing having a piston chamber 12 which is connected to the brake pipe 11 through a pipe and passage 13 and contains a piston 14 having a stem 15 adapted to operate a main slide valve 16 and an auxiliary slide valve 17 contained in a chamber 18, which chamber is connected to the auxiliary reservoir 9 through a passage and pipe 19.

The control valve device 2 may comprise a casing having a valve chamber 20 containing a slide valve 21 which is operatively connected to a stem 22. The valve 21 and stem 22 are adapted to be operated by spaced flexible diaphragms 23, 24 and 25 secured in the casing. The diaphragms 23 and 25 are of equal area and the diaphragm 24 is of greater area than either diaphragm 23 or 25.

The flexible diaphragm 24 is clamped between a follower plate 26 contained in the chamber 20 and a follower member 27 contained in a chamber 28 which chamber is constantly connected to atmosphere through a passage 29. The member 27 has screw-threaded connection with the stem 22 and the upper end of said member engages the under side of the diaphragm 23.

Contained in a chamber 30 at one side of the diaphragm 23 is a movable stop 31 subject on one side to the pressure of a spring 32.

The flexible diaphragm 25 is clamped between a follower plate 33 contained in the chamber 20 and a follower plate 34 contained in a chamber 35, through the medium of a nut 36 having screw-threaded connection with the lower end of the stem 22 which end passes through the follower plates and the diaphragm, the upper side of the plate 33 abutting against a shoulder 37 formed on the stem 22. Contained in the chamber 35 and interposed between the plate 34 and the casing is a coil spring 38, the upper end of the spring seating against the under side of the plate.

Within the chamber 35 the lower end of the stem 22 engages the upper end of a fluid pressure supply control member 39 which is slidably mounted in the casing and which is subject to the pressure of a coil spring 40 contained in a chamber 41 and interposed between the lower end of the member and the casing.

The member 39 is provided with a longitudinal groove 42, the lower end of which opens into a circular groove 43 formed in the member adjacent its lower end, said grooves establishing communication from the chamber 41 to the chamber 35.

Integral with the casing and contained in the chamber 20 is a lug 44 which at its end is provided with a seat for the slide valve 21.

The combined charging and discharging valve device 3 may comprise a casing in which there is secured a flexible diaphragm 55 having secured thereto a stem 56 adapted to operate a slide valve 57 contained in a chamber 58 at one side of the diaphragm.

Contained in a chamber 59 at the other side of the diaphragm 55, is a stop 60 which is subject to the pressure of a coil spring 61 and which is adapted to be engaged by one end of the stem 56.

The control reservoir 10 is constantly connected to the valve chamber 58 in the charging valve device 3 through a pipe and passage 62, and also to the diaphragm chamber 30 in the control valve device 2 through valve chamber 58 and a passage 63.

The load cylinder cut-in valve device 5 may comprise a casing containing a valve piston 64 having an annular washer 65 mounted in the upper end thereof adapted to seal against a seat ring 66. The lower end of the valve piston is adapted to seal against an annular washer 67 mounted in the casing. Contained in a chamber 68 at one side of the valve piston is a coil spring 69, the pressure of which, acting on the valve piston, normally maintains the washer 65 sealed against the seat ring 66, and the lower end of the valve piston out of sealing engagement with the washer 67.

The valve piston 64 is provided with an upwardly extending centrally arranged projection 70, the upper end of which, is adapted to engage with the quick inshot valve 4 to control the operation of the valve.

The empty brake cylinder 7 may comprise a cylinder containing a piston 71 having a hollow stem 72 in which there is mounted a push rod 73, the outer end of which is operatively connected with the usual brake levers and rods in any desired manner.

The load brake cylinder 8 may comprise a cylinder containing a piston 74 having a hollow stem 75 in which there is mounted a push rod 76 having a series of notches 77 formed therein with which a latch 78 is adapted to engage to maintain the adjustment of the push rod 76 when the load brake cylinder is being operated. This latch is operatively mounted in a box or casing 79 carried by the outer end of the hollow stem 75, and is subject to the pressure of a spring pressed plunger 80, contained in the casing, for assisting the latch to engage the push rod 76 within the notches 77. When the load brake cylinder is in release position, the latch 78 is held out of locking engagement with the push rod by the engagement of a pin 81 with the end of the casing of the brake cylinder, which pin is slidably mounted in the latch casing 79.

The outer end of the push rod 76 is connected to the outer end of the push rod 73 of the empty brake cylinder 7, through the medium of the usual fulcrumed lever 82 and rod 83.

In applying or releasing the brakes when the empty brake cylinder 7 only is employed, the push rod 76 of the load brake cylinder 8 moves in and out, as the case might be, relative to the hollow stem 75. When both brake cylinders are employed to apply the brakes, the empty brake cylinder 7 operates to take up the slack in the brake rigging and as it operates, the push rod 76 of the load brake cylinder 8 is moved outwardly relative to the hollow stem 75 by the lever 82. When a predetermined pressure has been obtained in the empty brake cylinder, the load brake cylinder is brought into operation, by the operation of the valve piston 64 of the load change-over valve device 5, and the piston 74, stem 75 and latch casing 79 are moved outwardly. As the latch casing is thus moved, the pressure on the pin 81 is relieved, so that the spring pressed plunger 80 will force the latch 78 into locking engagement with the push rod 76, and a continued outward movement of the piston will increase the braking force on the brake levers and consequently on the usual brake shoes (not shown).

In initially charging the equipment, fluid under pressure supplied to the brake pipe 11, flows to the piston chamber 12 in the triple valve device 1 through the pipe and passage 13, causing the piston 14 to be moved to its innermost or release position, as shown in the drawing, carrying with it the slide valves 16 and 17. With the piston in this position, fluid supplied to the piston chamber 12 flows to the valve chamber 18 in the triple valve device and auxiliary reservoir 9 through a passage 84, chamber 41 in the control valve device, grooves 43 and 42 in the member 39, diaphragm chamber 35 and passage 19.

Fluid under pressure from the brake pipe 11 is also supplied to the diaphragm chamber 59 in the charging valve device 3 through the pipe and the passage 13, and assuming the diaphragm 55 to be in the position shown in the drawing of fluid thus supplied to this chamber, and acting on one side of the diaphragm 55, causes said diaphragm to deflect to shift the stem 56 and slide valve 57 toward the right hand to their charging positions, in which the end of the stem abuts the casing and the slide valve uncovers a restricted port 86, so that fluid under pressure supplied to the passage 19 will also flow to the control reservoir 10 past a ball check valve 87, through port 86, valve chamber 58 in the charging valve device 3 and passage and pipe 62. From the valve chamber 58 fluid under pressure also flows to the diaphragm chamber 30 in the control valve device 2 through the passage 63. Now when the pressures of fluid in the chambers 58 and 59, at opposite sides of the diaphragm 55, are substantially equal, the inherent resiliency of the diaphragm may be sufficient to shift the stem 56 and slide valve 57 to their lap positions, as shown in the drawing, in which, the slide valve prevents the back flow of fluid from the control reservoir to the auxiliary reservoir. If, on the other hand, the resiliency of the diaphragm is not sufficient to cause the slide valve to be shifted to lap position, then the ball check valve 87 prevents the back flow of fluid from the control reservoir to the auxiliary reservoir until such time as the pressure of fluid in the chamber 59 is reduced sufficiently that the pressure of fluid in the chamber 58 causes the diaphragm to flex toward the left hand to the position shown in the drawing shifting the slide valve to lap position.

The flexible diaphragm 23 and 25 are of equal area, and since the pressure of fluid supplied to the diaphragm chambers 30 and 35 are substantially equal, the pressure of the spring 38 will maintain the diaphragm 23 in engagement with the stop 31. When the diaphragm engages the stop 31 a passage 85 through the lug 44 is uncovered by the slide valve 21, thus maintaining communication open from the diaphragm chamber 20 to the atmosphere through passage 85, a port 86 in the valve plug 87 of the release change-over valve device 6 and restricted atmospheric passage 88.

With the equipment thus being initially charged, the piston valve 64 of the load change-over valve device will be in its uppermost position and will maintain the quick inshot valve 4 unseated, so that the empty brake cylinder 7 is connected to the chamber 20 of the control valve device through a pipe and passage 90, a chamber 91 above the inner seated area of the valve piston 64, past the unseated quick inshot valve 4, valve chamber 92 containing the valve 4, a passage 93, a cavity 94 in the main slide valve 16 of the triple valve device, and a passage 95. With the valve piston 64 in this position, the load brake cylinder 8 is connected to atmosphere by way of a pipe and passage 99, a branch passage 100, past the unsealed lower end of the valve piston 64, chamber 68 and passage 101.

With the equipment thus fully charged and the empty and load brake cylinders connected to atmosphere, a service application of the brakes is effected by making a gradual brake pipe reduction in the usual manner, which results in a corresponding reduction in the pressure of fluid in the piston chamber 12 of the triple valve device 1. When the pressure of fluid in the piston chamber 12 is reduced, the pressure of fluid in the slide valve chamber 18 causes the triple valve piston 14 to operate to shift the auxiliary slide valve 17 and main slide valve 16 to their application positions.

When the triple valve slide valves are thus operated to their application positions, fluid under pressure supplied to the valve chamber 18 from the auxiliary reservoir 9, flows to the empty brake cylinder 7 through a port 102 in the main slide valve, passage 93, valve chamber 92, past the unseated quick inshot valve 4, chamber 91 and passage and pipe 90.

When the pressure of fluid in the empty brake cylinder 7 builds up to a predetermined degree sufficient to cause said brake cylinder to operate to take up the slack in the brake rigging, this pressure, present in the chamber 91, acting on the inner seated area of the valve piston 64 of the load cut-in valve device, causes said valve piston to move downwardly against the pressure of the spring 69, unseating the valve piston from the seat ring 66 and sealing the lower end of the valve piston against the washer 67. When the valve piston is thus forced downwardly, the quick inshot valve 4 seats, due to the force of gravity, thus closing off the unrestricted flow of fluid to the chamber 91. Fluid now flows from the passage 93 to the chamber 91 through a restricted passage 103.

From the chamber 91 fluid is supplied to the empty brake cylinder 7 in the manner described and to the load brake cylinder 8 past the unseated valve piston 64 and through passage and pipe 99. It will thus be seen that after the quick inshot valve 4 is seated, the restricted flow area of the passage 103 governs the rate of the flow of fluid to the brake cylinders and consequently governs the time required to effect an application of the brakes.

With the triple valve piston 14 in service position, passage 84 is connected to the valve chamber 18 so that the pressure of fluid in the chamber 35 in the control valve device reduces with the auxiliary reservoir pressure in chamber 18, so that the control reservoir pressure present in chamber 30 acting on the diaphragm 23, causes the slide valve 21 to be shifted downwardly against the reduced auxiliary reservoir pressure in chamber 35 and the pressure of the spring 38, lapping the passage 85 and thereby closing communication from the chamber 20 to the atmosphere. It will here be noted that the spring 61 of the charging valve device 3 is of such a value that when a service reduction in brake pipe pressure is effected, the stop 60, which is subject to the pressure of the spring 61, will, if the diaphragm 55 is in its intermediate position, as shown in the drawing, prevent the pressure of fluid in the slide valve chamber 58 from causing the diaphragm to be flexed toward the left hand so that the slide valve will maintain the passage 19, leading to the auxiliary reservoir, closed, thus the original control reservoir pressure will be maintained to govern the operation of the control valve device 2. If the diaphragm 55, stem 56 and slide valve 57 are in their extreme right hand positions when a service reduction in brake pipe pressure is initiated, the pressure of fluid in the slide valve chamber 58 will cause the diaphragm to flex to its intermediate position as shown in the drawing, shifting the stem and slide valve in the same direction until such time as the movement of the diaphragm is brought to a stop by one end of the stem 56 engaging the stop 60. When the stem engages the stop 60, the slide valve closes the passage 86 and maintains the passage 19 closed. It will be seen that when the slide valve 57 is in its extreme right hand position that the passage 86 is uncovered and that when a reduction in brake pipe pressure is initiated, the ball check valve 87 prevents the back flow of fluid from the control reservoir to the auxiliary reservoir until the passage 86 is closed by the slide valve.

If, in effecting an application of the brakes it is desired to limit the brake cylinder pressure, the usual brake valve device (not shown) is operated to lap position. Now when the pressure of fluid in the triple valve piston chamber 12 becomes slightly greater than the auxiliary reservoir pressure in the valve chamber 18, the piston 14 operates to shift the auxiliary slide valve 17, relative to the main slide valve 16, to service lap position, in which the valve 17 laps the port 102 in the main slide valve 16, thus closing off the further supply of fluid under pressure to the brake cylinders.

To release the brakes after a service application, the pressure of fluid in the brake pipe 11 is increased in the usual manner, causing the triple valve piston 14 to operate to release position, in which the passage 84 is again connected with the piston chamber 12, so that fluid at brake pipe pressure is again supplied from the piston chamber 12 to the diaphragm chamber 35 in the control valve device and auxiliary reservoir 9. Now when the pressure of fluid thus supplied to the diaphragm chamber 35 is again substantially equal to control reservoir pressure in the diaphragm chamber 30, acting on the diaphragm 23, the pressure of the spring 38 causes the diaphragms to shift the stem 22 and slide valve 21 upwardly until the diaphragm 23 engages the inner surface of the stop 31, at which time the operation of the control valve device will cease and the slide valve 21 will uncover the passage 85.

The operation of the triple valve piston 14 to release position, shifts the triple valve slide valves 16 and 17 to release positions, in which fluid under pressure from the brake cylinders is vented to the atmosphere through chamber 91, passage 103 and past the quick inshot valve 4, passage 93, cavity 94 in the triple valve slide valve 16, passage 95, chamber 20 in the control valve device 2, passages 85, port 86 in the release change-over valve 6 and restricted atmospheric passage 88.

In releasing the brakes on a train, it is desirable to have the brakes throughout the length of the train release at substantially the same time in order to prevent the undue stretching between cars which would result if the brakes at the front end of the train were released before those at the rear end. In order to effect a rapid release of the brakes the brake pipe pressure is rapidly restored to its normal value or is temporarily increased to some extent above this value. Due to friction, the pressure of fluid in the brake pipe at the front end of the train builds up more rapidly than at the rear of the train and consequently would cause the brakes at the front end of the train to release in advance of those at the rear.

In the practice of my invention the objectionable feature referred to in the preceding paragraph will be eliminated. In this connection it will be noted that when the brake pipe pressure is increased to effect the release of the brakes, the triple valve pistons 14 at the front end of the train will promptly move to release positions and supply fluid at brake pipe pressure from the triple valve piston chambers 12 to the chambers 35 of the control valve devices through passages 84, chambers 41 in the control valve devices, slots 43 and 42 in the members 39, and from the chambers 35 fluid under pressure is supplied to the triple valve chambers 18 and the auxiliary reservoirs through passages 19.

Now if the flow of fluid to the diaphragm chambers 35 is at too fast a rate, i. e. at a rate greater than the rate of discharge of fluid from the brake cylinders to atmosphere as governed by the size of the orifices in the choke plugs 88, the pressure in the chambers 35 will build up to such an extent as to overcome the pressure of fluid in the chambers 30, acting on the diaphragm 23, and the brake cylinder pressure in chambers 20 acting on the diaphragms 24 and 25, causing the diaphragms to operate to shift the stems 22 upwardly against the pressure of the spring pressed stops 31, compressing the springs 32 until the diaphragms 23 abut the casings. When the stems 22 are thus moved, their pressure against the upper ends of the members 39 are relieved and the pressure of the springs 40 cause the members 39 to move upwardly with the stems and when the stems come to rest, as just described, the members 39 will also come to rest in such positions that the circular slots 43 will be restricted in width by the casings, so that the flow of fluid will be at a restricted rate, thus restricting the rate of recharge of the auxiliary reservoirs. By thus restricting the rate of recharge of the auxiliary reservoirs at the front end of the train, the fluid which would otherwise be supplied to these reservoirs, will flow toward the rear of the train and thus insure the prompt release of the triple valve devices at the rear of the train. It will be seen from the foregoing description that I provide for a quick and substantially uniform release of the brakes throughout the length of the train.

In order to control a train on a grade, it is the practice to alternately apply and partially release the brakes a number of times in a manner commonly termed cycling. Preparatory to descending a grade, my improved equipment is intentionally overcharged, say for instance five or more pounds in excess of the normal pressure and when the pressure of fluid in chamber 35 becomes substantially equal to the pressure of fluid in chamber 30, the pressure of the spring 38 will cause the control valve device to be operated upwardly until the diaphragm 23 comes to rest against the stop 31 as shown in the drawing. The first application on the descending grade will be effected in substantially the same manner as has hereinbefore been described in connection with a service application of the brakes. When such an application is thus effected, the pressure of fluid in the chamber 60, in the valve device 3, together with the pressure of the spring 61 acting on one side of the diaphragm 55, is sufficient to prevent the pressure of fluid in the slide valve chamber 58, acting on the opposite side of the diaphragm, from flexing the diaphragm toward the left hand beyond its intermediate position, so that the slide valve 57 will maintain the passage 19 closed, thus preventing the pressure of fluid in the control reservoir from reducing into the auxiliary reservoir. As hereinafter more fully described, the valve device 3 will not be caused to operate to discharge fluid under pressure from the overcharged control reservoir until an over-reduction in brake pipe pressure is effected. Now the equipment is recharged to the normal brake pipe pressure, causing the triple valve device to operate to release position, in which fluid under pressure in the brake cylinders will flow to atmosphere in the same manner as has also been hereinbefore described. When the pressure of fluid in the chamber 20 is reduced sufficiently that the upward pressure on the underside of the large diaphragm 24, as well as the upward pressure of fluid in chamber 35 on the diaphragm 25 is less than the downward pressure of fluid in the chamber 30 on the upper side of the diaphragm 23 and the downward pressure of fluid on the diaphragm 25, the control valve device will be caused to operate downwardly, shifting the slide valve 21 to a position in which it laps the passage 85, thus closing communication from the chamber 20 to atmosphere and retaining a predetermined pressure in the brake cylinder which is proportionate to the overcharge of the equipment, which overcharge is governed by the engineer according to the conditions of the grade. Upon effecting a reapplication of the brakes, the brake cylinder pressure obtained will exceed that retained in the brake cylinders from the previous application, by an amount porportional to the brake pipe reduction, thereby insuring the proper control of the train.

If, when the foot of the grade is reached, the equipment is again recharged with fluid at a pressure equal to the original overcharge, the control valve device 2 will again operate to release position as shown in the drawing, thus exhausting all brake cylinder pressure to the atmosphere. It will thus be seen that my improved control valve device will perform the functions of a retainer valve device and that the engineer may readily and accurately control its operation in accordance with the conditions of grades.

If at any time and for any reason the control reservoirs 10 become overcharged or in the case of the changing of locomotives of a train upon reaching a terminal with the control reservoirs on the train charged above the pressure carried by the substituted locomotive, the engineer may operate the usual brake valve device to application position and thus reduce the brake pipe pressure and when the brake pipe pressure reduces to a predetermined valve, say for instance 30 pounds, the control reservoir pressure present in the valve chamber 58 of the valve device 3 causes the diaphragm 55 to deflect toward the left hand against the pressure of the spring-pressed stop 60, operating the control slide valve 57 in chamber 58 in the same direction to a position in which the passage 19 is uncovered, so that fluid under pressure from the control reservoir 10 will reduce into the auxiliary reservoir through pipe and passage 62, valve chamber 58, and passage and pipe 19. Now when the engineer operates the brake valve to release position, the control reservoir will be charged with fluid under pressure to the setting of the feed valve or to the pressure of any other fluid pressure supply source, i. e. the normal brake pipe pressure.

When it is desired to obtain a higher brake cylinder pressure than can be obtained in a service application, an over reduction in brake pipe pressure may be effected, which results in the valve device 3 operating to supply fluid under pressure from the control reservoir to the auxiliary reservoir.

It will here be noted that when the train is descending a grade and the control reservoir has been overcharged for the proper control of the brakes, the engineer may, upon the train reaching the foot of the grade, release the brakes and then reduce the control reservoir pressure by effecting an over reduction in brake pipe pressure, after which said reservoir may be recharged with fluid at the normal brake pipe pressure. When an over reduction in brake pipe pressure is thus effected, the brakes are of course applied and the train may be brought to a stop before the release of the brakes can be effected. If, however, it is not desired to effect an application of the brakes at the foot of the grade, the brake pipe pressure may be increased to the original overcharge which, as before stated, may be substantially five pounds higher than the brake pipe pressure normally carried. The equipment when so overcharged will function in the same manner as when charged to the normal pressure. Now when it is desired to bring the train to a stop, an over reduction in brake pipe pressure is effected, causing the brakes to be applied and effecting a reduction in control reservoir pressure. In effecting the release of the brakes, the control reservoir will be recharged with fluid at the normal brake pipe pressure.

If, after a service application of the brakes, it is desired to graduate their release, the brake pipe pressure may be increased to effect the desired reduction in brake cylinder pressure. This increase in brake pipe pressure causes the triple valve device to operate to release position, in which the brake cylinders are connected to the chamber 20 in the control valve device 2. Since, with the triple valve device in release position, the pressure in the chamber 35 in the control valve device and in the auxiliary reservoir will be increased an amount equal to the increase in brake pipe pressure and the pressure in chamber 35 acting on the diaphragm 25, causes the slide valve 21 of the control valve device to be shifted upwardly to uncover the passage 85, thus venting fluid under pressure from the brake cylinders to the atmosphere in the manner hereinbefore described. Now when the brake cylinder pressure effective in chamber 20, in the control valve device, reduces an amount proportionate to the increase in brake pipe pressure, the slide valve 21 will be shifted downwardly to the position in which it laps the passage 85, thus closing off the further exhaust of fluid under pressure from the brake cylinders. By effecting further increases in brake pipe pressure the equipment will operate to further reduce brake cylinder pressure. It will be understood that when the control valve device operates to release the brakes the member 39 will be operated to control the recharge of the auxiliary reservoir in the same manner as hereinbefore described.

Should it be desired to prevent the graduated release of the brakes and permit only the direct release thereof, the plug valve 87 of the release change-over valve device 6 is rotated to a position in which the port 86 therein establishes communication from the passage 95 to the restricted atmospheric passage 88, so that when the triple valve device 1 operates to release position and establishes communication from the brake cylinders to the passage 95, fluid under pressure from the brake cylinders will be directly vented to the atmosphere. Since the passage 95 is connected to the chamber 20 of the control valve device, fluid at brake cylinder pressure will be effective in said chamber to govern the operation of the control valve device, in the manner hereinbefore described, for automatically governing the rate of recharge of the auxiliary reservoir.

It will be apparent from the foregoing description that I have provided a novel fluid pressure brake equipment in which the control valve device 2, when the control reservoir is charged with fluid at the pressure normally carried in the brake pipe, is operable automatically to govern the rate of recharge of the auxiliary reservoir 9 in releasing the brakes and which, when the control reservoir 10 is overcharged, is operable to graduate the release of the brakes in cycling on a descending grade. In view of this, the importance of controlling the control reservoir pressure is obvious and it is for this controlling purpose that the valve device 3 is provided. This valve device 3 is operative to establish communication through which the control reservoir is charged with fluid under pressure when the brake pipe pressure is higher than control reservoir pressure and is operative to bottle up the control reservoir pressure when a service reduction in brake pipe pressure is effected and is further operative upon the effecting of an over reduction in brake pipe pressure to vent fluid under pressure from the control reservoir.

A further feature of the invention resides in the provision of the release change-over valve device 6 which in one position provides for either the direct or graduated release of the brakes and which in another position provides for the direct release of the brakes independently of the control valve device 2, thus the control valve device is rendered ineffective to graduate the release of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe and brake cylinder, of a plurality of normally charged reservoirs, valve means operated upon a reduction in brake pipe pressure for supplying fluid under pressure from one of said reservoirs to the brake cylinder, and means subject to brake pipe pressure and operated upon an over reduction in brake pipe pressure for supplying fluid under pressure from the other reservoir to the first mentioned reservoir.

2. In a fluid pressure brake, the combination with a brake pipe and a brake cylinder, of a plurality of reservoirs charged with fluid under pressure from the brake pipe, means operative upon effecting a service reduction in brake pipe pressure for supplying fluid under pressure from one of said reservoirs to the brake cylinder, and means subject to brake pipe pressure and operative upon effecting an over reduction in brake pipe pressure for supplying fluid under pressure from another of said reservoirs to the first mentioned reservoir.

3. In a fluid pressure brake, the combination with a brake pipe and a brake cylinder, of a plurality of reservoirs charged with fluid under pressure from the brake pipe, means subject to the opposing pressures of the brake pipe and one of said reservoirs for controlling the supply of fluid under pressure to the brake cylinder, and means subject to the opposing pressures of the brake pipe and another of said reservoirs for supplying fluid under pressure from the last mentioned reservoir to the first mentioned reservoir.

4. In a fluid pressure brake, the combination with a brake pipe and a brake cylinder, of a plurality of reservoirs charged with fluid under pressure from the brake pipe, means subject to the opposing pressures of the brake pipe and one of said reservoirs for controlling the supply of fluid under pressure to the brake cylinder, and means subject to brake pipe pressure for supplying fluid under pressure from another of said reservoirs to the first mentioned reservoir.

5. In a fluid pressure brake, the combination with a brake pipe and a brake cylinder, of a plurality of reservoirs, a triple valve device subject to brake pipe pressure for supplying fluid under pressure from said brake pipe to one of said reservoirs, means subject to brake pipe pressure for supplying fluid under pressure, supplied by said triple valve device, to another of said reservoirs and operative upon effecting an over reduction in brake pipe pressure for supplying fluid under pressure from the last mentioned reservoir to the first mentioned reservoir.

6. In a fluid pressure brake, the combination with a brake pipe and a brake cylinder, of a plurality of reservoirs, a triple valve device subject to brake pipe pressure for supplying fluid under pressure from said brake pipe to one of said reservoirs, a valve device subject to brake pipe pressure for supplying fluid under pressure supplied to the triple valve device to another of said reservoirs and operative upon effecting an over reduction in brake pipe pressure for supplying fluid under pressure from the last mentioned reservoir to the first mentioned reservoir, and means included in said valve device for rendering said valve device inoperative to supply fluid under pressure to the first mentioned reservoir when a service reduction in brake pipe pressure is effected.

7. In a fluid pressure brake, the combination with a brake pipe, a brake cylinder, an auxiliary reservoir and another reservoir, of a triple valve device subject to brake pipe pressure for supplying fluid under pressure from the brake pipe to the auxiliary reservoir, and means subject to brake pipe pressure for supplying fluid under pressure, supplied by said triple valve device, to the other reservoir, and operative upon effecting an over reduction in brake pipe pressure for supplying fluid under pressure from said other reservoir to said auxiliary reservoir, said means being inoperative to supply fluid under pressure to said auxiliary reservoir upon effecting a service reduction in brake pipe pressure.

8. In a fluid pressure brake, the combination with a brake pipe, a brake cylinder, an auxiliary reservoir and another reservoir, of a triple valve device operative upon effecting an increase in brake pipe pressure for establishing communication through which said brake cylinder is connected to atmosphere and for supplying fluid under pressure from said brake pipe to said auxiliary reservoir, means subject to brake pipe pressure for supplying fluid under pressure, supplied by said triple valve device, to the other reservoir, said triple valve device being operative upon effecting a reduction in brake pipe pressure for closing off the supply of fluid under pressure from the brake pipe to the auxiliary reservoir and for establishing communication through which fluid under pressure is supplied from said auxiliary reservoir to the brake cylinder, and means for preventing fluid under pressure in said other reservoir from reducing into the auxiliary reservoir when the pressure of fluid in said auxiliary reservoir reduces into said brake cylinder.

9. In a fluid pressure brake, the combination with a brake pipe, a brake cylinder, an auxiliary reservoir and another reservoir, of a triple valve device operative upon effecting an increase in brake pipe pressure for establishing communication through which said brake cylinder is connected to atmosphere and for supplying fluid under pressure from said brake pipe to said auxiliary reservoir, means subject to brake pipe pressure for supplying fluid under pressure, supplied by said triple valve device, to the other reservoir, said triple valve device being operative upon effecting a reduction in brake pipe pressure for closing off the supply of fluid under pressure from the brake pipe to the auxiliary reservoir and for establishing communication through which fluid under pressure is supplied from said auxiliary reservoir to the brake cylinder, and a check valve for preventing fluid under pressure in said other reservoir from reducing into the auxiliary reservoir when the pressure of said auxiliary reservoir reduces into the brake cylinder.

10. In a fluid pressure brake, the combination with a brake pipe, a brake cylinder, an auxiliary reservoir and another reservoir, of a triple valve device operative upon effecting an increase in brake pipe pressure for establishing communication through which said brake cylinder is connected to atmosphere and for supplying fluid under pressure from said brake pipe to said auxiliary reservoir, means subject to brake pipe pressure for supplying fluid under pressure, supplied by said triple valve device, to the other reservoir, said triple valve device being operative upon effecting a reduction in brake pipe pressure for closing off the supply of fluid under pressure from the brake pipe to the auxiliary reservoir and for establishing communication through which fluid under pressure is supplied from said auxiliary reservoir to the brake cylinder, and a check valve for preventing fluid under pressure in said other reservoir from reducing into the auxiliary reservoir when the pressure of said auxiliary reservoir reduces into the brake cylinder, said means being operative upon effecting an over reduction in brake pipe pressure for supplying fluid under pressure from said other reservoir to the auxiliary reservoir.

11. In a fluid pressure brake, the combination with a triple valve device, of means operative in the release position of said triple valve device for at one time effecting a graduated release of the brakes and at another time for effecting a direct release of the brakes, and a manually operative valve device for selectively rendering said means effective and ineffective to graduate the release of the brakes.

12. In a fluid pressure brake, the combination with a triple valve device, of pressure sensitive means operative in the release position of said triple valve device for at one time effecting a graduated release of the brakes and at another time for effecting a direct release of the brakes.

13. In a fluid pressure brake, the combination with a triple valve device, of means automatically operative in the release position of said triple valve device for at one time effecting a graduated release of the brakes and at another time for effecting a direct release of the brakes.

14. In a fluid pressure brake, the combination with a brake pipe and a triple valve device, of means subject to brake pipe pressure and operative in the release position of said triple valve device for at one time effecting a graduated release of the brakes and at another time for effecting a direct release of the brakes.

15. In a fluid pressure brake, the combination with a brake pipe and a triple valve device, of a valve operative in the release position of the triple valve device for at one time effecting a direct release of the brakes and operative at another time to effect a graduated release of the brakes, and pressure sensitive means for controlling the operation of said valve.

16. In a fluid pressure brake, the combination with a brake pipe and a triple valve device, of a valve operative in the release position of the triple valve device for at one time effecting a direct release of the brakes and operative at another time to effect a graduated release of the brakes, and means subject to brake pipe pressure for controlling the operation of said valve.

17. In a fluid pressure brake, the combination with a brake pipe and a triple valve device, of a valve operative in the release position of the triple valve device for at one time effecting a direct release of the brakes and operative at another time to effect a graduated release of the brakes, and means operative according to variations in brake pipe pressure for controlling the operation of said valve.

18. In a fluid pressure brake, the combination with a brake pipe, a triple valve device and a reservoir charged with fluid under pressure, of means subject to the pressure of fluid in said reservoir and fluid under pressure from the brake pipe and operative in the release position of the triple valve device for at one time effecting a graduated release of the brakes and at another time for effecting a direct release of the brakes.

19. In a fluid pressure brake, the combination with a brake pipe and a triple valve device, of means subject to a constant pressure and the pressure of fluid from said brake pipe and operative in the release position of said triple valve device for at one time effecting a graduated release of the brakes and at another time for effecting a direct release of the brakes.

20. In a fluid pressure brake, the combination with a brake pipe, a brake cylinder, and a triple valve device having a position for supplying fluid under pressure to the brake cylinder to effect an application of the brakes and a position for releasing fluid under pressure from the brake cylinder to release the brakes, of means subject to a constant pressure, pressure of fluid from the brake pipe and pressure of fluid from the brake cylinder, and operative in the release position of the triple valve device for at one time effecting a graduated release of the brakes and at another time for effecting the direct release of the brakes.

21. In a fluid pressure brake, the combination with a triple valve device, of means operative in the release position of said triple valve device for at one time effecting a graduated release of the brakes and at another time for effecting a direct release of the brakes, and means operative to prevent the graduated release of the brakes.

22. In a fluid pressure brake, the combination with a triple valve device, of means operative in the release position of said triple valve device for at one time effecting a graduated release of the brakes and at another time for effecting a direct release of the brakes, and a valve manually operative to one position for preventing the graduated release of the brakes.

23. In a fluid pressure brake, the combination with a triple valve device, of means operative in the release position of said triple valve device for at one time effecting a graduated release of the brakes and at another time for effecting a direct release of the brakes, and a valve operative to render said means operative or inoperative to effect a graduated release of the brakes.

24. In a fluid pressure brake, the combination with a brake pipe, an auxiliary reservoir and a brake cylinder, of means operative upon a reduction in brake pipe pressure for supplying fluid under pressure from the auxiliary reservoir to the brake cylinder to effect an application of the brakes, and operative upon an increase in brake pipe pressure for establishing a communication through which fluid under pressure is discharged from the brake cylinder to effect a release of the brakes, and means for controlling the flow of fluid through said communication and subject to auxiliary reservoir pressure for governing the charging of said reservoir.

25. In a fluid pressure brake, the combination with a brake pipe, a triple valve device having a single release position and an auxiliary reservoir adapted to be charged with fluid under pressure from the brake pipe, of means operative in the release position of said triple valve device for controlling the release of the brakes and for controlling the supply of fluid from said brake pipe to the auxiliary reservoir.

26. In a fluid pressure brake, the combination with a brake pipe, a triple valve device having a single release position and an auxiliary reservoir adapted to be charged with fluid under pressure from the brake pipe, of means operative in the release position of said triple valve device for controlling the release of the brakes and for controlling the rate of flow of fluid under pressure from said brake pipe to the auxiliary reservoir.

27. In a fluid pressure brake, the combination with a brake pipe and an auxiliary reservoir adapted to be charged with fluid under pressure from the brake pipe, of a triple valve device having a single release position and operative to said release position upon an increase in brake pipe pressure in releasing the brakes, and means operative in the release position of the triple valve device, according to the rate of increase in brake pipe pressure, for governing the rate of flow of fluid from the brake pipe to the auxiliary reservoir.

28. In a fluid pressure brake, the combination with a brake pipe and an auxiliary reservoir adapted to be charged with fluid under pressure from the brake pipe, of a triple valve device having a single release position and operative to said release position upon an increase in brake pipe pressure in releasing the brakes, and means operative in the release position of the triple valve device for governing the rate of charging said auxiliary reservoir according to the increase in brake pipe pressure.

29. In a fluid pressure brake, the combination with a brake pipe and an auxiliary reservoir adapted to be charged with fluid under pressure from the brake pipe, of a triple valve device having a single release position and operative to said release position upon an increase in brake pipe pressure in releasing the brakes, and means operative in the release position of the triple valve device for governing the rate of charging said auxiliary reservoir according to brake pipe pressure.

30. In a fluid pressure brake, the combination with a brake pipe and an auxiliary reservoir adapted to be charged with fluid under pressure from the brake pipe, of a triple valve device having a single release position and operative to said release position upon an increase in brake pipe pressure in releasing the brakes, and means operative in the release position of the triple valve device for charging said reservoir with fluid under pressure from the brake pipe at a rate inversely proportionate to the rate of increase in brake pipe pressure.

31. In a fluid pressure brake, the combination with a brake pipe, a brake cylinder, and an auxiliary reservoir adapted to be charged with fluid under pressure from the brake pipe, of a triple valve device having a single release position and operative to said release position upon an increase in brake pipe pressure in releasing the brakes, and means subject, in the release position of the triple valve device, to brake cylinder pressure for governing the rate of recharge of said reservoir.

32. In a fluid pressure brake, the combination with a brake pipe, a brake cylinder, and an auxiliary reservoir adapted to be charged with fluid under pressure from the brake pipe, of a triple valve device having a single release position and operative to said release position upon an increase in brake pipe pressure in releasing the brakes, and means subject, in the release position of the triple valve device, to the opposing pressures of the brake cylinder and auxiliary reservoir for governing the rate of recharge of said reservoir according to the rate of increase in brake pipe pressure.

33. In a fluid pressure brake, the combination with a brake pipe, a brake cylinder, and an auxiliary reservoir adapted to be charged with fluid under pressure from the brake pipe, of a triple valve device having a single release position and operative to said release position upon an increase in brake pipe pressure in releasing the brakes, and means operative upon an increase in brake pipe pressure and a decrease in brake cylinder pressure for governing the rate of charging said reservoir.

34. In a fluid pressure brake, the combination with a brake pipe, a brake cylinder, and an auxiliary reservoir adapted to be charged with fluid under pressure from the brake pipe, of a triple valve device having a single release position and operative to said release position upon an increase in brake pipe pressure in releasing the brakes, and means operative for restricting the rate of flow of fluid from said brake pipe to the auxiliary reservoir when the rate of increase in auxiliary reservoir pressure exceeds the rate of decrease in brake cylinder pressure, and a stop included in said means for preventing the operation of said means to restrict the rate of flow of fluid to the auxiliary reservoir when the rate of decrease in brake cylinder pressure does not exceed the rate of increase in auxiliary reservoir pressure.

35. In a fluid pressure brake, the combination with a triple valve device and a brake cylinder, of means operative when said triple valve device is in release position for controlling the discharge of fluid under pressure from the brake cylinder to release the brakes, and operative with the triple valve device in release position in cycling the brakes for retaining a predetermined brake cylinder pressure.

36. In a fluid pressure brake, the combination with a brake pipe, a brake cylinder, and a triple valve device, of a reservoir charged with fluid under pressure from said brake pipe, means for controlling the supply of fluid under pressure to said reservoir, means subject to the pressures of fluid in said reservoir, brake pipe and brake cylinder, for controlling the discharge of fluid under pressure from the brake cylinder and for retaining a predetermined pressure in said brake cylinder, said means being subject to variations in the pressure of said reservoir for varying the pressure retained in the brake cylinder.

37. In a fluid pressure brake, the combination with a brake pipe, a brake cylinder, and a reservoir charged with fluid at the pressure normally carried by the brake pipe and adapted to be charged with fluid at a pressure above that normally carried by the brake pipe, of means operated upon an increase in brake pipe pressure for effecting a partial release of fluid from the brake cylinder and adapted to increase the degree of pressure retained in the brake cylinder in partially releasing the brakes as the pressure of fluid in said reservoir is increased above normal.

38. In a fluid pressure brake, the combination with a brake pipe, a brake cylinder, and a reservoir charged with fluid at the pressure normally carried by the brake pipe and adapted to be charged with fluid at a pressure above that normally carried by the brake pipe, of means operated upon an increase in brake pipe pressure for effecting a partial release of fluid from the brake cylinder and adapted to vary the pressure of fluid retained in the brake cylinder in partially releasing the brakes according to the degree of pressure carried in said reservoir.

39. In a fluid pressure brake, the combination with a brake pipe, a brake cylinder, and a reservoir charged with fluid at the pressure normally carried by the brake pipe and adapted to be charged with fluid at a pressure above that normally carried by the brake pipe, of means operated upon an increase in brake pipe pressure for effecting a partial release of fluid from the brake cylinder and adapted to vary the pressure of fluid retained in the brake cylinder in partially releasing the brakes according to variations in the degree of pressure carried by said reservoir in excess of the pressure of fluid normally carried by said reservoir.

40. In a fluid pressure brake equipment, the combination with a brake pipe, of a valve device operated upon a reduction in brake pipe pressure for effecting an application of the brakes, and subject to an increase in brake pipe pressure for assisting in effecting a release of the brakes, of means operative in the release position of said valve device for governing the release of the brakes and operative, after an increase in brake pipe pressure above the brake pipe pressure normally carried, for retaining a pressure in the brake cylinder proportional to the increase in brake pipe pressure above that normally carried in the brake pipe.

41. In a fluid pressure brake equipment, the combination with a brake pipe, of a valve device operated upon a reduction in brake pipe pressure for effecting an application of the brakes, and subject to an increase in brake pipe pressure for assisting in effecting a release of the brakes, of means operative in the release position of said valve device for governing the release of the brakes and operative, after an increase in brake pipe pressure above the brake pipe pressure normally carried, for retaining a pressure in the brake cylinder proportional to the increase in brake pipe pressure above that normally carried in the brake pipe, and means operative upon effecting an over reduction in brake pipe pressure for rendering the first mentioned means inoperative to maintain brake cylinder pressure upon a recharge of the brake pipe to its normal pressure.

42. In a fluid pressure brake, the combination with a brake pipe and brake cylinder, of a normally charged reservoir, valve means subject to the pressure of fluid from said reservoir for controlling the pressure of fluid in the brake cylinder, and means operated upon an overreduction in brake pipe pressure for venting fluid from said reservoir.

43. In a fluid pressure brake, the combination with a brake pipe, an auxiliary reservoir and a brake cylinder, of a normally charged reservoir, valve means subject to the opposing pressures of the auxiliary reservoir and said normally charged reservoir for controlling the pressure of fluid in the brake cylinder, and means operated upon an over-reduction in brake pipe pressure for venting fluid from said normally charged reservoir.

44. In a fluid pressure brake, the combination with a brake pipe and brake cylinder, of a reservoir normally charged with fluid at the normal brake pipe pressure, means operative upon an increase in brake pipe pressure above normal for overcharging said reservoir above normal, and valve mechanism subject to the pressure of fluid from the overcharged reservoir for controlling the release of fluid from the brake cylinder, said means being operative upon effecting a reduction in brake pipe pressure a predetermined amount below normal for reducing the pressure of fluid in said reservoir.

45. In a fluid pressure brake, the combination with a brake pipe, a triple valve device and an auxiliary reservoir adapted to be charged with fluid under pressure from the brake pipe, of means separate from the triple valve device and operative in the release position of said triple valve device for controlling the release of the brakes and for controlling the supply of fluid from said brake pipe to the auxiliary reservoir.

46. In a fluid pressure brake, the combination with a brake pipe, a triple valve device and an auxiliary reservoir adapted to be charged with fluid under pressure from the brake pipe, of means separate from the triple valve device and operative in the release position of said triple valve device for controlling the release of the brakes and for controlling the rate of flow of fluid under pressure from said brake pipe to the auxiliary reservoir.

47. In a fluid pressure brake, the combination with a brake pipe and a brake cylinder, of a normally charged reservoir, valve means subject to the pressure of fluid from said reservoir for controlling the pressure of fluid in the brake cylinder, and means operated upon a reduction in brake pipe pressure a predetermined amount below normal for reducing the pressure of fluid in said reservoir, said means being operative to limit the degree of reduction in the pressure of fluid in said reservoir.

48. In a fluid pressure brake, the combination with a brake pipe and a brake cylinder, of a normally charged reservoir, valve means subject to the pressure of fluid from said reservoir for controlling the pressure of fluid in the brake cylinder, and means operated upon a reduction in brake pipe pressure a predetermined amount below normal for reducing the pressure of fluid in said reservoir, said means being subject to brake pipe pressure and the pressure of a spring for limiting the degree of reduction in the pressure of fluid in said reservoir.

In testimony whereof I have hereunto set my hand.

CLYDE C. FARMER.